(12) United States Patent
Hand et al.

(10) Patent No.: US 9,756,508 B2
(45) Date of Patent: *Sep. 5, 2017

(54) SYSTEM AND METHOD FOR DETERMINING THE LOCATION OF A STATION IN A WIRELESS ENVIRONMENT

(71) Applicant: XIRRUS, INC., Thousand Oaks, CA (US)

(72) Inventors: Alan Jeffrey Hand, Tarzana, CA (US); James Kirk Mathews, Hidden Hills, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,805

(22) Filed: Jun. 9, 2015

(65) Prior Publication Data

US 2016/0127917 A1    May 5, 2016

Related U.S. Application Data

(63) Continuation of application No. 13/242,710, filed on Sep. 23, 2011, now Pat. No. 9,055,450.

(51) Int. Cl.
| | |
|---|---|
| *H04W 24/00* | (2009.01) |
| *H04W 16/24* | (2009.01) |
| *H04W 24/08* | (2009.01) |
| *H04B 17/318* | (2015.01) |
| *H04L 12/24* | (2006.01) |
| *H04W 64/00* | (2009.01) |

(52) U.S. Cl.
CPC ......... *H04W 16/24* (2013.01); *H04B 17/318* (2015.01); *H04L 41/142* (2013.01); *H04W 24/00* (2013.01); *H04W 24/08* (2013.01); *H04W 64/003* (2013.01)

(58) Field of Classification Search
CPC ..... H04W 24/00; H04W 24/08; H04W 16/24; H04W 64/003; H04W 24/06; H04B 17/318; H04B 7/08; H04L 41/142; H04L 25/03; H04L 25/02
USPC ............... 455/456.1–456.6, 67.11, 41.2, 446
See application file for complete search history.

(56) References Cited

U.S. PATENT DOCUMENTS

| | | | |
|---|---|---|---|
| 9,055,450 B2* | 6/2015 | Hand | H04W 24/00 |
| 2009/0157301 A1* | 6/2009 | Tien | G01C 21/3492 701/465 |

(Continued)

*Primary Examiner* — Khawar Iqbal
(74) *Attorney, Agent, or Firm* — SoCal IP Law Group LLP; John E. Gunther; Steven C. Sereboff

(57) ABSTRACT

A system for quantifying the shadow fading observed in a wireless environment having multiple wireless access points is also provided. A distance determination module is in signal communication with the wireless access points. The distance determination module determines a distance between a pair of the wireless access points based on location information that relates to the locations of the wireless access points at the wireless environment. A shadow fading determination module is also in signal communication with the wireless access points. The shadow fading determination module determines a shadow fading factor based on the distance between a pair of the wireless access points and based on RSS information received from one of the wireless access points in the pair of wireless access points.

28 Claims, 7 Drawing Sheets

(56) References Cited

U.S. PATENT DOCUMENTS

| | | | |
|---|---|---|---|
| 2009/0312027 A1* | 12/2009 | Foschini | H04W 24/02 455/446 |
| 2010/0109864 A1* | 5/2010 | Haartsen | G01C 21/206 340/539.13 |
| 2010/0178940 A1* | 7/2010 | Mcaleenan | H04W 64/00 455/456.5 |
| 2010/0203839 A1* | 8/2010 | Duan | H04B 17/318 455/67.11 |
| 2011/0319100 A1* | 12/2011 | Flanagan | G01S 5/021 455/456.5 |
| 2013/0005348 A1* | 1/2013 | Sanders | G01S 3/30 455/456.1 |
| 2013/0070621 A1* | 3/2013 | Marzetta | H04B 7/024 370/252 |
| 2013/0072205 A1* | 3/2013 | Wang | H04L 1/0019 455/450 |
| 2013/0315156 A1* | 11/2013 | Xiao | H04B 7/024 370/329 |
| 2015/0063095 A1* | 3/2015 | Deng | H04W 8/005 370/221 |
| 2015/0105087 A1* | 4/2015 | Horner | H04W 24/08 455/446 |
| 2015/0131470 A1* | 5/2015 | Boulton | G01S 5/0221 370/252 |
| 2016/0157145 A1* | 6/2016 | Brueck | H04W 24/02 370/331 |

* cited by examiner

SYSTEM AND METHOD FOR DETERMINING THE LOCATION OF A STATION IN A WIRELESS ENVIRONMENT

CROSS REFERENCE TO RELATED APPLICATIONS

This application is a continuation application of U.S. patent application Ser. No. 13/242,710 entitled "SYSTEM AND METHOD FOR DETERMINING THE LOCATION OF A STATION IN A WIRELESS ENVIRONMENT", filed on Sep. 13, 2011, by inventors Alan Jeffrey Hand and James Kirk Mathews, issued as U.S. Pat. No. 9,055,450 on Jun. 9, 2015, the contents of which are incorporated herein by reference in its entirety.

BACKGROUND

Network administrators may desire to keep track of stations associated with wireless access points on a wireless network. Additionally, network administrators may desire to pinpoint the location of stations in a wireless environment. Tracking and localizing a station in a wireless environment may be difficult, however, due to the nature of wireless communications. The physical properties and characteristics of the wireless environment may affect the propagation of the wireless signals through the wireless environment. Additionally, conventional wireless access points may not be able to determine the position of a station relative to the wireless access points. Therefore, there exists a need for an improved approach to determining the location of a station in a wireless environment.

SUMMARY

A computer-implemented method of quantifying the shadow fading observed in a wireless environment having multiple wireless access points is provided. Location information relating to locations of the wireless access points at the wireless environment is received. The distance between a pair of the wireless access points is determined based on the location information. A shadow fading factor is determined based on the distance between the pair of the wireless access points and based on received signal strength (RSS) information received from one of the wireless access points in the pair of wireless access points.

A system for quantifying the shadow fading observed in a wireless environment having multiple wireless access points is also provided. A distance determination module is in signal communication with the wireless access points. The distance determination module determines a distance between a pair of the wireless access points based on location information that relates to the locations of the wireless access points at the wireless environment. A shadow fading determination module is also in signal communication with the wireless access points. The shadow fading determination module determines a shadow fading factor based on the distance between a pair of the wireless access points and based on RSS information received from one of the wireless access points in the pair of wireless access points.

A computer-implemented method of localizing a station in a wireless environment having multiple wireless access points is also provided. A shadow fading factor for the wireless environment is determined. Respective distances between the station and the wireless access points is determined based on the shadow fading factor for the wireless environment and based on RSS information received from the wireless access points. A sub-region in the wireless environment that the station is located in is identified. A location associated with the sub-region that corresponds to an approximate location of the station at the wireless environment is also identified.

A system for localizing a station in a wireless environment having multiple access points is further provided. A shadow fading determination module determines a shadow fading factor for the wireless environment. A distance determination module determines respective distances between the station and the wireless access points based on the shadow fading factor and based on RSS information received from the wireless access points. A localization module identifies a sub-region in the wireless environment based on the distances and identifies a location associated with the sub-region that corresponds to an approximate location of the station at the wireless environment.

DETAILED DESCRIPTION

A system and method for determining the location of a station in a wireless environment is provided. The task of determining the location of a station in a wireless environment may be referred to as station localization. The system and method provided may be used to determine the location of a station relative to two or more wireless arrays in a wireless environment. Determining the location of a station in a wireless environment may be advantageously improved by determining a shadow fading factor for the wireless environment as discussed further below. Additionally, various approaches may be employed to determine the location of a station depending on whether the wireless environment includes two or more than two wireless arrays.

Wireless Arrays

Figure 1:
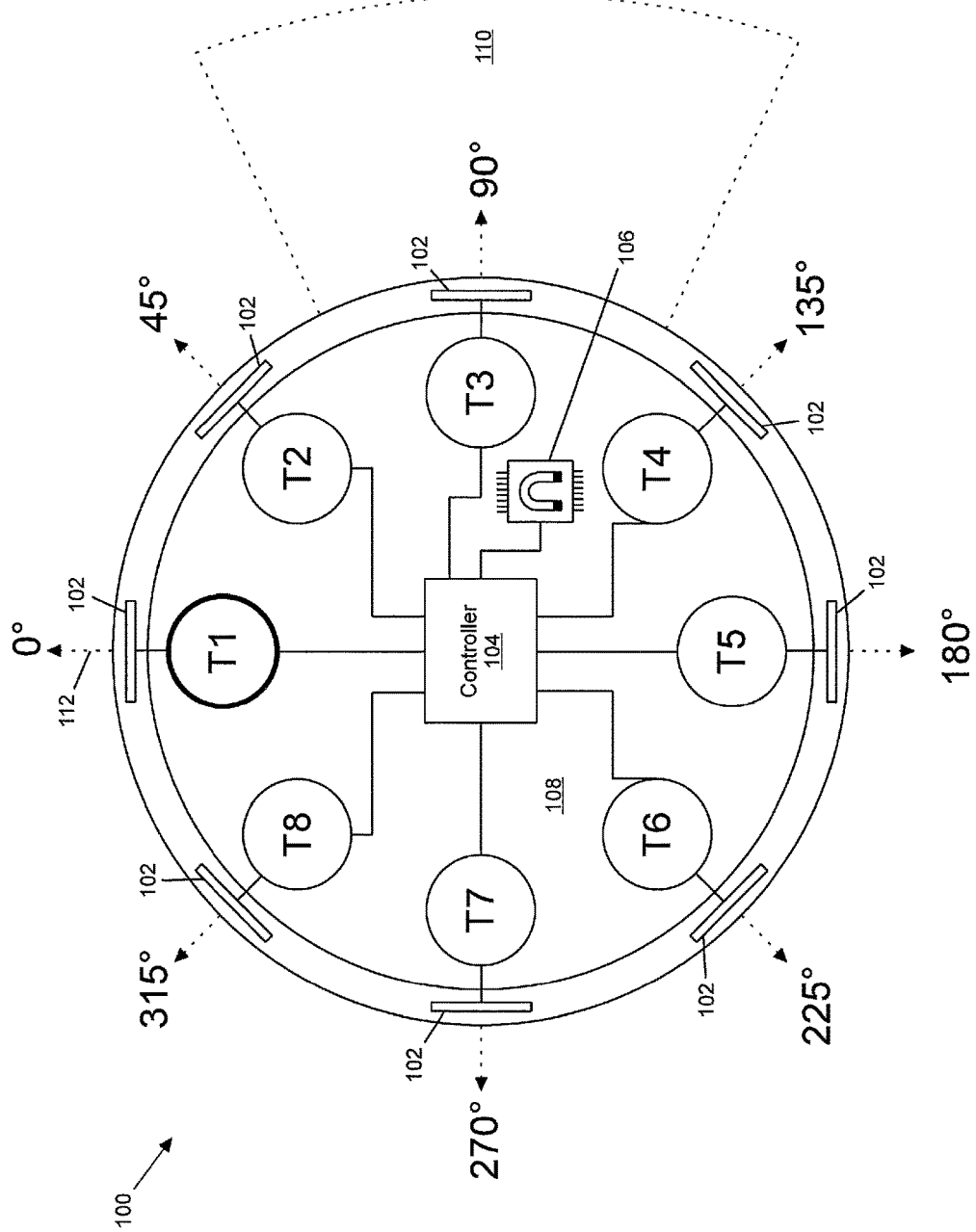
FIG. 1 is an example of an implementation of a wireless array having a magnetometer.

A wireless array is a type of wireless access device (or access point). In this example, a wireless array has multiple transceivers for exchanging wireless communications with a station. Referring to FIG. 1, an example of a wireless array 100 is shown. The wireless array 100, in this example, includes eight transceivers T1-T8. The wireless array 100 may include an alternative number of transceivers such as, for example, four transceivers, twelve transceivers, or sixteen transceivers. Each transceiver T1-T8 of the wireless array, in this example, is in signal communication with a corresponding antenna 102. Each transceiver T1-T8 is also in signal communication with a controller 104 such as, for example, a media access controller (MAC) that manages the wireless communications exchanged between a station and a transceiver T1-T8 of the wireless array 100. The wireless array 100 may be in signal communication with a station (and vice versa) when the devices transmit wireless signals within range of each other such that the devices can hear each other (i.e., receive the transmitted wireless signals).

The wireless array 100 in this example also includes a magnetometer 106 that determines the spatial orientation of the wireless array relative to a magnetic field (e.g., the magnetic field of the Earth). In this way, the magnetometer 106 of the wireless array 100 may determine the spatial orientation of the wireless array relative to, for example, the surface of the Earth based on the Earth's magnetic field. The magnetometer 106 may be any form of sensor capable of determining the spatial orientation of the wireless array 100 relative to a magnetic field. For example, the magnetometer 106 may be an integrated circuit that is secured to the motherboard 108 of the wireless array 100 and that is in signal communication with the controller 104 of the wireless array. A suitable magnetometer may be available from Honeywell Aerospace in Plymouth, Minn. as model designation HMC5883L. A suitable magnetometer may also be available from Freescale Semiconductor, Inc. in Austin, Tex. as model designation MAG3110.

Knowing the spatial orientation of the wireless array 100 itself provides the ability to determine the orientation of the transceivers T1-T8 and their associated antennas 102 in the wireless array as well. As seen in FIG. 1, the transceivers T1-T8 and antennas 102 of the wireless array 100 are distributed around the circumference of the wireless array. The antennas 102 may be directional antennas configured to broadcast wireless signals in a radial direction away from the center of the wireless array. Accordingly, each antenna 102 in the wireless array, in this example, may broadcast a directional antenna pattern 110 that covers a portion of the circular area surrounding the wireless array 100.

In the example shown, the antennas 102 of the wireless array 100 are position at 45° intervals around the circumference of the wireless array. For example, transceiver T1 may be described as being 0° from the top of the wireless array 100; transceiver T2 is 45° clockwise (CW) from the top of the wireless array; transceiver T3 is 90° CW; and so forth for transceivers T4-T8.

The magnetometer 106 may indicate the spatial orientation of the wireless array 100 as an azimuth value corresponding to the angular measurement of the bearing of the wireless array relative to a reference bearing. The bearing of the wireless array 100 may be described according to the orientation of the transceiver at the top of the wireless array, which is transceiver T1 in this example. A reference bearing corresponding to magnetic north may be used to determine the spatial orientation of the wireless array 100 relative to the surface of the Earth.

In this example, the reference bearing 112 corresponds to 0° as shown in FIG. 1. Accordingly, the spatial orientation of the wireless array 100 may be described as 0° because the transceiver T1 at the top of the array has a 0° orientation. If the transceiver T1 is oriented at 45° CW from the reference bearing 112 (i.e., 0°), then the orientation of the wireless array 100 may be described as 45°. When the spatial orientation of the wireless array 100 is known along with the positions of the transceivers T1-T8 and the antennas 102 in the wireless array, the spatial orientation of the antennas may also be determined, i.e., which direction the antennas are pointing.

As mentioned above, the antennas 102 of the wireless array 100 are positioned around the circumference of the wireless array in 45° intervals. Thus, the spatial orientation of an antenna 102 may be determined, in this example, by adding the spatial orientation of the wireless array 100 itself to the position of the antenna in the wireless array. For example, if the wireless array 100 is oriented 45° CW from the reference bearing 112 (i.e. 0°), each of the antennas 102 in the wireless array, in this example, is shifted 45° CW. Therefore when the wireless array 100, in this example, is oriented at 45°, transceiver T3 is oriented at 135° (45° wireless array orientation plus 90° antenna position equals 135° antenna orientation). The spatial orientation of the antennas 102 in the wireless array 100 may be used when determining the location of a station in a wireless environment as discussed further below.

One of the transceivers T1-T8 in the wireless array 100 may be designated as the monitor transceiver for the wireless array. The monitor transceiver may be used to monitor other wireless arrays in the wireless environment that are in signal communication with the wireless array 100 having the monitor transceiver. In this example, the monitor transceiver is transceiver T1 as indicated in FIG. 1 with the heavier outline. Where other wireless arrays also include multiple transceivers, the monitor transceiver T1 of the wireless array 100 may monitor the individual transceivers of the other wireless arrays.

The wireless array 100 may also include network uplinks (not shown) to connect the wireless array to a wired network. The network uplinks may be, for example, Ethernet interfaces to connect the wireless array to a wired IP-based (internet protocol) network. As discussed further below, the network uplinks may connect the wireless array 100 to a network management system for remote monitoring and management of the wireless array in the wireless environment.

Wireless Environments and Network Management Systems

Figure 2:
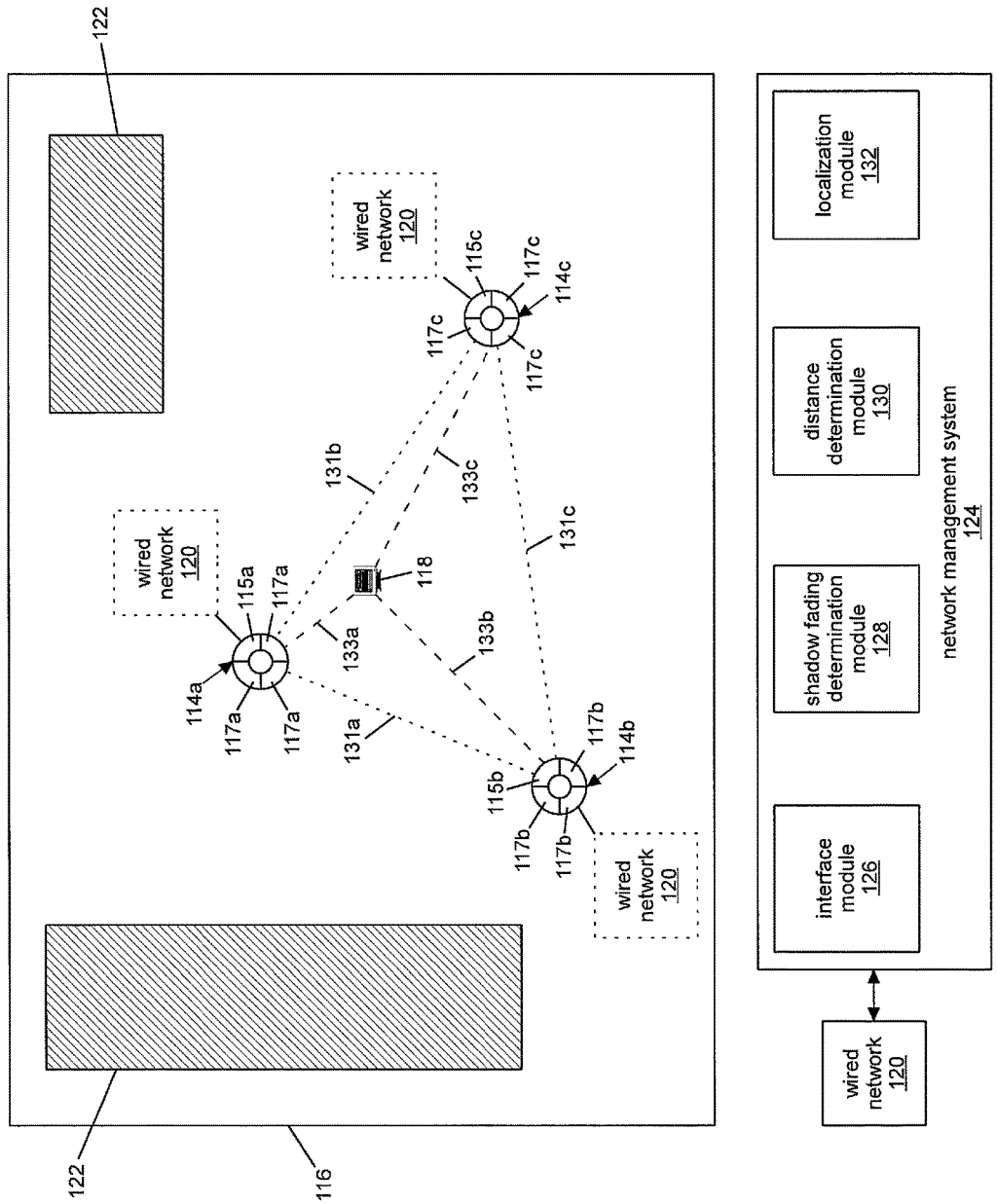
FIG. 2 is an example of an implementation of a network management system in signal communication with wireless arrays in the wireless environment.

Referring to FIG. 2, three wireless access points 114a, 114b, and 114c are shown installed in a wireless environment 116. In this example, the three wireless access points 114a, 114b, and 114c are wireless arrays. Each wireless array 114 in this example includes four transceivers—one monitoring transceiver and three non-monitoring transceivers. The wireless arrays 114, in this example, serve as wireless access points for a station 118 in the wireless environment. The station 118 may be any device configured to transmit wireless signals according to a wireless protocol, e.g., the IEEE 802.11 protocol. A station may be, for example: a desktop, laptop, tablet, or palmtop computer; a wireless access point; a mobile telephone, a wireless tag, and the like. In the example shown, the station 118 is a computer. The wireless arrays 114, in the example shown, may also be considered stations as each wireless array may exchange wireless signals with the other wireless arrays. Each of the wireless arrays 114 in this example is connected to a wired network 120. The wireless arrays 114 provide the station 118 with access to the wired network 120 by exchanging wireless signals with the station.

Propagation of the wireless signals through the wireless environment 116 may be affected by the unique physical properties of the wireless environment. Attenuation of the wireless signals may result from free space propagation, reflection, diffraction, and scattering. The level of attenuation the wireless signals undergo may be referred to as path loss, which represents the difference between the power of the wireless signal when the signal is transmitted and the power of the wireless signal when the signal is received. Path loss may be measured in decibels (dB).

Path loss may depend on, for example, the distance between the station 118 and the wireless arrays 114 as well as the amount and type of obstructions 122 present in the wireless environment 116. Obstructions may include, for example, walls, doors, windows, ceilings, floors, cubicles, desks, filing cabinets, tables, furniture, and even people. It will be thus understood that wireless signals may propagate through various wireless environments differently due to the unique physical properties of each environment.

Various models exist to quantify the path loss (i.e., the amount of attenuation) that is expected for a wireless environment 116. A path loss model that quantifies the expected path loss (PL) in dB may be expressed as:

$$PL = PL_{ref} + 10 \log(D^n) + S \qquad (1)$$

where PL represents the difference between the transmitted signal power and the received signal power; $PL_{ref}$ represents a reference path loss in dB between the transmitted signal power and the received signal power when the transmitter (i.e., the station 118) and receiver (i.e., a wireless array 114) are around one meter apart with no obstructions in between; D represents the distance in meters between the transmitter and the receiver; n represents a path loss exponent for the wireless environment 116; and S represents a shadow fading factor.

The path loss exponent, n, in this example, may depend on the frequency of the wireless signal, the type of wireless environment 116, and the obstructions present in the wireless environment. At 2.4 GHz (gigahertz), for example, the following path loss exponents may be used: n=2 open free space environments (e.g., outdoors); n=3-3.5 for indoor office environments; and n=4-4.5 for indoor home or hospital environments, which may be relatively more dense as a result of having more obstructions. The wireless environment 116 in FIG. 2, for example, includes two solid obstructions 122 that may affect propagation of the wireless signals through the environment and contribute to path loss.

The shadow fading factor, S, in this example path loss model, may also depend on the amount and type of obstructions 122 present in the wireless environment 116. Where there is a relatively high number of obstructions 122 present in the wireless environment 116, a suitable shadow fading factor may be, for example, around 7 dB. As discussed further below, however, the accuracy of the path loss model may depend on using a shadow fading factor that accurately corresponds to the unique physical properties of the wireless environment 116.

Still referring to FIG. 2, the wired network 120 may also be in signal communication with a network management system 124. In turn, the network management system 124 may be in signal communication with the wireless arrays 114 via the wired network 120 and in signal communication with the station 118 in the wireless environment 116 via the wireless arrays. The network management system 124 may monitor and configure the wireless arrays 114 installed in the wireless environment 116. The network management system 124 may also monitor wireless communications between the wireless arrays 114 and the station 118 in the wireless environment 116.

The network management system 124 includes various modules that localize the station 118 in signal communication with the wireless arrays 114 in the wireless environment 116. As discussed in more detail below, the network management system 124 in this example includes: an interface module 126 that receives user input corresponding to the locations of the wireless arrays 114 in the wireless environment 116; a shadow fading determination module 128 that determines a shadow fading factor for the wireless environment; a distance determination module 130 that determines the distance between the station 118 and the wireless arrays 114; and a localization module 132 that determines an approximate location for the station 118 in the wireless environment.

The interface module 126 may display a scaled floor map of the wireless environment 116. A user may indicate on the floor map the location of one or more wireless arrays 114 installed in the wireless environment 116. The location of a wireless array 114 may be received as user input from the user and stored, for example, as an x-y coordinate. Additionally, because the floor map is scaled, the network management system 124 may determine the distance between the wireless arrays 114 installed in the wireless environment 116. The network management system 124 may determine the distance between the coordinates for the wireless arrays 114 on the floor map and scale the map distance to an actual distance using the map scale. In the example shown, the network management system 124 may determine respective distances between the wireless arrays 114: distance 131*a* between wireless array 114*a* and 114*b*; distance 131*b* between wireless array 114*a* and 114*c*; and distance 131*c* between wireless array 114*b* and 114*c*. As discussed further below, the respective distances 131 between the wireless arrays 114 in the wireless environment 116 may be used to determine the location of the station 118 in the wireless environment.

The network management system 124 may determine the location of the station 118 in the wireless environment 116 based on wireless signals received at the wireless arrays 114 from the station. More particularly, the network management system 124 may determine the location of the station 118 in the wireless environment 116 based on the power of the wireless signals received at wireless arrays 114 from the station. Determining the location of the station 118 in the wireless environment may be referred to as station localization.

The power of a received wireless signal may be referred to as the received signal strength (RSS). An example model for quantifying the RSS may be expressed as:

$$Rx_{pwr} = Tx_{pwr} - L_{Tx} + G_{Tx} - PL - L_{Rx} + G_{Rx} \qquad (2)$$

where $Rx_{pwr}$ is the received signal strength (RSS) in dB; $Tx_{pwr}$ is the output power of the transmitter (i.e., the station 118) in dB; $L_{Tx}$ is the sum of all cable and connector losses in dB at the transmitter; $G_{Tx}$ is the antenna gain at the transmitter in dBi (decibel isotropic); PL is the path loss of the wireless signal in dB; $L_{Rx}$ is the sum of all cable and connector losses in dB at the receiver (i.e., the wireless array 114); and $G_{Rx}$ is the antenna gain at the receiver in dBi.

As mentioned above, the network management system 124 in this example determines the location of the station 118 in the wireless environment 116 based on wireless signals received at the wireless arrays 114 from the station. When the station 118 is in signal communication with the wireless arrays 114, the station may probe the transceivers T1-T8 (FIG. 1) of the wireless arrays to determine which wireless array and, in particular, which wireless array transceiver is most suitable to associate with (e.g., based on signal strength). The wireless arrays 114 in this example include multiple transceivers T1-T8 as discussed above. Each transceiver T1-T8 may broadcast multiple SSIDs (service set identifiers). Accordingly, the station 118, in this example, may transmit a wireless signal as a probe request to each transceiver-SSID combination the station can detect in order to determine which wireless array 114, transceiver T1-T8, and SSID is most suitable to associate with. In some example implementations, the station may automatically determine which transceiver to associate with based on the signal strength, e.g., the transceiver with the strongest signal strength. Additionally, selection of which SSID to connect to may be automatic based on a pre-configuration of the station or may be manual based on a user selection.

The wireless arrays 114 may store the RSS for the probe requests received from the station 118. It will be understood that, in some circumstances, the station 118 may not transmit a probe request to a transceiver T1-T8 of a wireless array 114 if the station cannot detect an SSID broadcast from the transceiver. In an example scenario, however, the station 118 may transmit a respective probe request to each of the wireless array transceivers T1-T8 the station 118 can detect.

Because the network management system 124 in this example is in signal communication with the wireless arrays 114 in the wireless environment 116, the network management system may access the stored RSS values for the probe requests from the station 118. The network management system 124 may receive the RSS values from the wireless arrays 114 via the wired network 120 in response to receipt at the wireless arrays of a request for the RSS values from the network management system. The network management system 124 may use the respective RSS values received from the wireless arrays to respectively determine the distance between the station 118 and the wireless arrays 114. As shown in FIG. 2, the station 118 is a distance 133a away from wireless array 114a; a distance 133b away from wireless array 114b; and a distance 133c away from wireless array 114c.

To determine the distances 133 between the station 118 and the wireless arrays 114, the path loss model (1) may be substituted for the path loss parameter, PL, in the RSS model (2):

$$Rx_{pwr} = Tx_{pwr} - L_{Tx} + G_{Tx} - (PL_{ref} + 10 \log(D^n) + S) - L_{Rx} + G_{Rx} \qquad (3)$$

The RSS model may then be rearranged to solve for the distance parameter, D. Accordingly, the distance determination module 130 may use the following rearranged RSS model to determine the distance between the station 118 (i.e., the transmitter) and one of the wireless arrays 114 (i.e., the receiver):

$$D = \sqrt[n]{\text{antilog}[(Tx_{pwr} - L_{Tx} + G_{Tx} - PL_{ref} - S - L_{Rx} - G_{Rx} - Rx_{pwr})/10]} \qquad (4)$$

In this rearranged RSS model, the distance, D, is the unknown value, and the values for $Rx_{pwr}$, $Tx_{pwr}$, $L_{Tx}$, $G_{Tx}$, $L_{Rx}$, $G_{Rx}$, $PL_{ref}$ and S may be known. The power of the received signal, $Rx_{pwr}$, is the RSS of the wireless signals received at the wireless array 114 from the station 118. The wireless array 114 stores RSS values for wireless signals received from the station 118, and the network management system 124 may access the RSS values stored at the wireless arrays. The power of the transmitted wireless signal, $Tx_{pwr}$, is the output power of the station 118 (i.e., the transmitter). The value used for the power of the transmitted signal, $Tx_{pwr}$, may be based on, for example, the types of wireless components (e.g., antennas) found in wireless devices such as laptops or mobile telephones. For example, the value of the power of the transmitted wireless signal, $Tx_{pwr}$, may be around 13-18 dB. In some example implementations, a value of 15 dB may be employed for the value of the power of the transmitted wireless signal, $Tx_{pwr}$.

The loss values, $L_{Tx}$ and $L_{Rx}$, may be negligible since the station 118 and the wireless arrays 114, in this example, use internal antennas, which results in negligible cable loss. Accordingly, the distance determination module 130 in this example assumes that $L_{Tx}$ and $L_{Rx}$ are equal to zero.

Like the value for the power of the transmitted wireless signal, $Tx_{pwr}$, the values used for the antenna gain, $G_{Tx}$ and $G_{Rx}$, may be based on the types of antennas found in wireless devices such as laptops and mobile telephones. In some example implementations, the values for the antenna gain, $G_{Tx}$ and $G_{Rx}$, may be obtained from the antenna manufacturer or market data and may be around 0-1 dBi. In other example implementations, the values for the antenna gain, $G_{Tx}$ and $G_{Rx}$ may be around 0.5 dBi.

As mentioned above, the reference path loss, $PL_{ref}$, may be a reference value for the path loss observed when the station 118 and a wireless array 114 are around one meter apart with no obstructions in between. The value for the reference path loss, $PL_{ref}$, may be determined based on the wavelength of the wireless signal. For example, the following formulas may be used to determine a value for the reference path loss, $PL_{ref}$:

$$20 \log_{10}\left(\frac{4\pi}{\lambda}\right) \qquad (5)$$

$$\lambda = \frac{c}{f} \qquad (6)$$

where λ is the wavelength of the wireless signal in meters (m) and determined by dividing the speed of light (299,792,458 meters per second), c, by the frequency (cycles per second), f, of the wireless signal. In the field of wireless communications, different frequencies may define different channels. For example, under the IEEE 802.11 standard, channel 1 has a frequency of 2.412 GHz, channel 11 has a frequency of 2.462 GHz, etc. Accordingly, a wireless signal transmitted at a frequency of 2.412 GHz has a wavelength, λ, of around 0.124 m.

Also mentioned above, the shadow fading factor, S, may depend on the type of wireless environment 116 and the obstructions 122 present in the wireless environment. The shadow fading observed at the wireless environment 116, however, may vary significantly depending on the unique physical properties of the wireless environment such as, for example, the amount and type of obstructions 122 present in the wireless environment. Accordingly, the accuracy of the distance calculation may depend on an accurate value for the shadow fading factor. Therefore, the accuracy of the distance formula may be advantageously improved by using a shadow fading factor that accurately corresponds to the shadow fading actually observed in the wireless environment 116.

The network management system 124 in this example includes a shadow fading determination module 128 that determines a shadow fading factor for the wireless environment 116. The shadow fading determination module 128 uses a technique similar to determining the distance between the station 118 and a wireless array in the wireless environment 116. As mentioned above, the wireless arrays 114 include a monitor transceiver (e.g., transceiver T1) to monitor the other wireless arrays in the wireless environment 116. The monitor transceiver T1 of a wireless array 114 exchanges wireless signals with the other wireless arrays in the wireless environment. Each wireless array 114 in the wireless environment 116 may monitor the other wireless arrays by exchanging wireless signals in this fashion.

Additionally, the wireless arrays 114 may store RSS values for wireless signals received from the other wireless arrays in the wireless environment 116. Furthermore, the respective distances 131 between the wireless arrays 114 in the wireless environment 116 may be known as a result of the user input received indicating the respective positions of the wireless arrays on the floor map for the wireless environment.

To determine the shadow fading factor for the wireless environment 116, the path loss model (1) may again be substituted for the path loss parameter, PL, in the RSS model (2) to obtain the model according to equation 3 above. The RSS model may again be rearranged to solve for S:

$$S = Tx_{pwr} - L_{Tx} + G_{Tx} - PL_{ref} - 10\log(D^n) + G_{Rx} - L_{Rx} - Rx_{pwr} \quad (7)$$

In this example, the distance, D, between the transmitter (i.e., one of the wireless arrays) and the receiver (i.e., another one of the wireless arrays) is known based on the respective positions for the wireless arrays 114 indicated on the floor map for the wireless environment 116. Accordingly, the known values for the rearranged RSS model may be used to determine a shadow fading factor, S.

Because the wireless environment 116 may include more than one wireless array 114, the shadow fading determination module 128 may determine multiple shadow fading factors, S, and determine an average shadow fading factor, $S_{avg}$, based on the multiple shadow fading factors. The shadow fading determination module 128 may determine a shadow fading factor, S, for each pairing of a monitor transceiver 115 at one wireless array and a non-monitor transceiver 117 at another wireless array. As mentioned above, the monitor transceiver of a wireless array may monitor the non-monitor transceivers of another wireless array.

When determining multiple shadow fading factors, S, the shadow fading determination module 128 may pair each respective monitor transceiver 115a, 115b, and 115c in the wireless arrays 114a, 114b, and 114c with the respective non-monitor transceivers 117a, 117b, and 117c of the corresponding wireless arrays. In the example shown in FIG. 2, the shadow fading determination module 128 may pair the monitor transceiver 115a in wireless array 114a with each of the respective three non-monitor transceivers 117b and 117c of wireless arrays 114b and 114c, which results in six transceiver pairings for the monitor transceiver 115a of wireless array 114a. The shadow fading determination module 128 may make similar transceiver pairings for the respective monitor radios 115b and 115c in wireless arrays 114b and 114c for a total of eighteen transceiver pairings in this example. Accordingly, the shadow fading determination module 128 may determine and average a total eighteen shadow fading factors, S, to calculate the average shadow fading factor, $S_{avg}$, for the wireless environment 116. As another example, where three wireless arrays in a wireless environment each include eight total transceivers (one monitoring and seven non-monitoring transceivers) as in FIG. 1, the shadow fading determination module 128 may determine and average a total of forty-two shadow fading factors, S, to calculate the average shadow fading factor, $S_{avg}$, for the wireless environment.

The distance determination module 130 of the network management system 124 may then, when determining the respective distances 133 between the station 118 and a wireless array 114, use the average shadow fading factor, $S_{avg}$, instead of a shadow fading factor typical to the type of wireless environment. In this way, the accuracy of the distance determination may be advantageously improved.

The network management system 124 in the example shown also includes a localization module 132 that determines the location of the station 118 in the wireless environment. The techniques used to localize the station 118 may differ depending on the number of wireless arrays 114 that are installed in the wireless environment 116. As discussed in more detail below, the localization module 132 of the network management system 124 may employ one technique when three or more arrays 114 are installed in the wireless environment 116 and a different technique when there are two wireless arrays installed.

Figure 3:
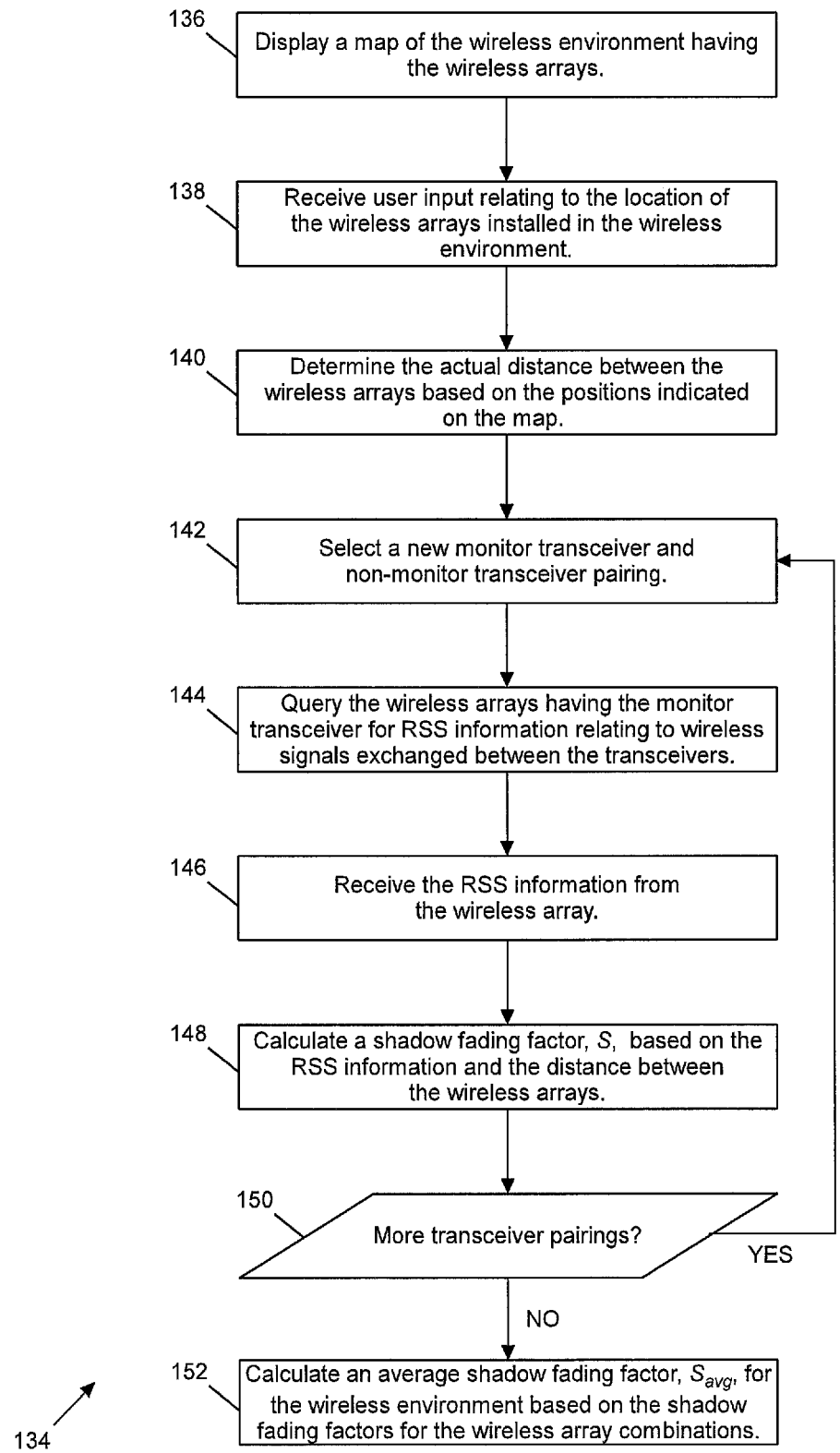
FIG. 3 is a flowchart of example methods steps for determining an average shadow fading factor for a wireless environment.

Referring to FIG. 3, a flow chart 134 of example method steps for determining an average shadow fading factor for a wireless environment is shown. A network management system 124 (FIG. 2) may carry out the example method steps shown in FIG. 3. The network management system 124 may be a network management system as described above in reference to FIG. 2. The interface module 126 of the network management system 124 may display a map of the wireless environment 116 having the wireless arrays 114 (step 136). The map may be a floor map and indicate the position of physical structures (e.g., walls, etc.) in the wireless environment 116. The map may include a map scale such that a distance on the map may be scaled to an actual distance in the wireless environment 116. The interface module 126 may receive user input relating to the location of the wireless arrays 114 in the wireless environment 116 (step 138). For example, a user may indicate on the map the locations that correspond to the installation locations for the wireless array 114 in the wireless environment 116. The network management system 124 may determine the respective distances 131 between the wireless arrays 114 based on the respective positions for the wireless arrays 114 indicated on the map (step 140). The map scale may be used to scale the map distances 131 to actual distances between the wireless arrays 114 in the wireless environment 116.

The shadow fading determination module 128 then selects a transceiver pairing from the transceivers of the group of wireless arrays 114 installed in the wireless environment 116 (step 142). As discussed above, a monitor transceiver 115 (e.g., transceiver T1) at each wireless array 114 may monitor the non-monitor transceivers 117 of the other wireless arrays in the wireless environment 116 by exchanging wireless signals with the non-monitor transceivers of the other wireless arrays. The wireless arrays 114 may store RSS information relating to the wireless signals exchanged between the monitor transceivers 115 and the non-monitor transceivers 117. The network management system 124 may query a wireless array 114 having a monitor transceiver for the RSS information relating to wireless signals exchanged between the monitor transceiver and a non-monitor transceiver of the another wireless array (step 144), and the RSS information for the transceiver pairing may be received at the network management system from the wireless array in response (step 146).

Based on the RSS information for the transceiver pairing, the shadow fading determination module 128 may determine a shadow fading factor for the wireless environment 116 (step 148). The shadow fading determination module 128 may determine a shadow fading factor for each transceiver pairing as discussed above in reference to FIG. 2. If there are additional transceiver pairings (step 150), then the shadow fading factor determination module 128 may select a new transceiver pairing (step 142) and determine additional signal fading factors for the new transceiver pairing (steps 144-148). In some example implementations, the shadow fading determination module 128 may determine signal fading factors for every transceiver pairing. If multiple signal fading factors, S, are determined, then the shadow fading determination module 128 may determine an average signal fading factor, $S_{avg}$, for the wireless environment 116 by averaging the multiple signal fading factors (step 152). As discussed above, the distance determination module 130 may use the average signal fading factor, $S_{avg}$, when determining the distance between a station 118 and a wireless array 114 in the wireless environment 116 in order to improve the accuracy of the distance determination.

Station Localization Using Three or More Wireless Arrays

Figure 4:
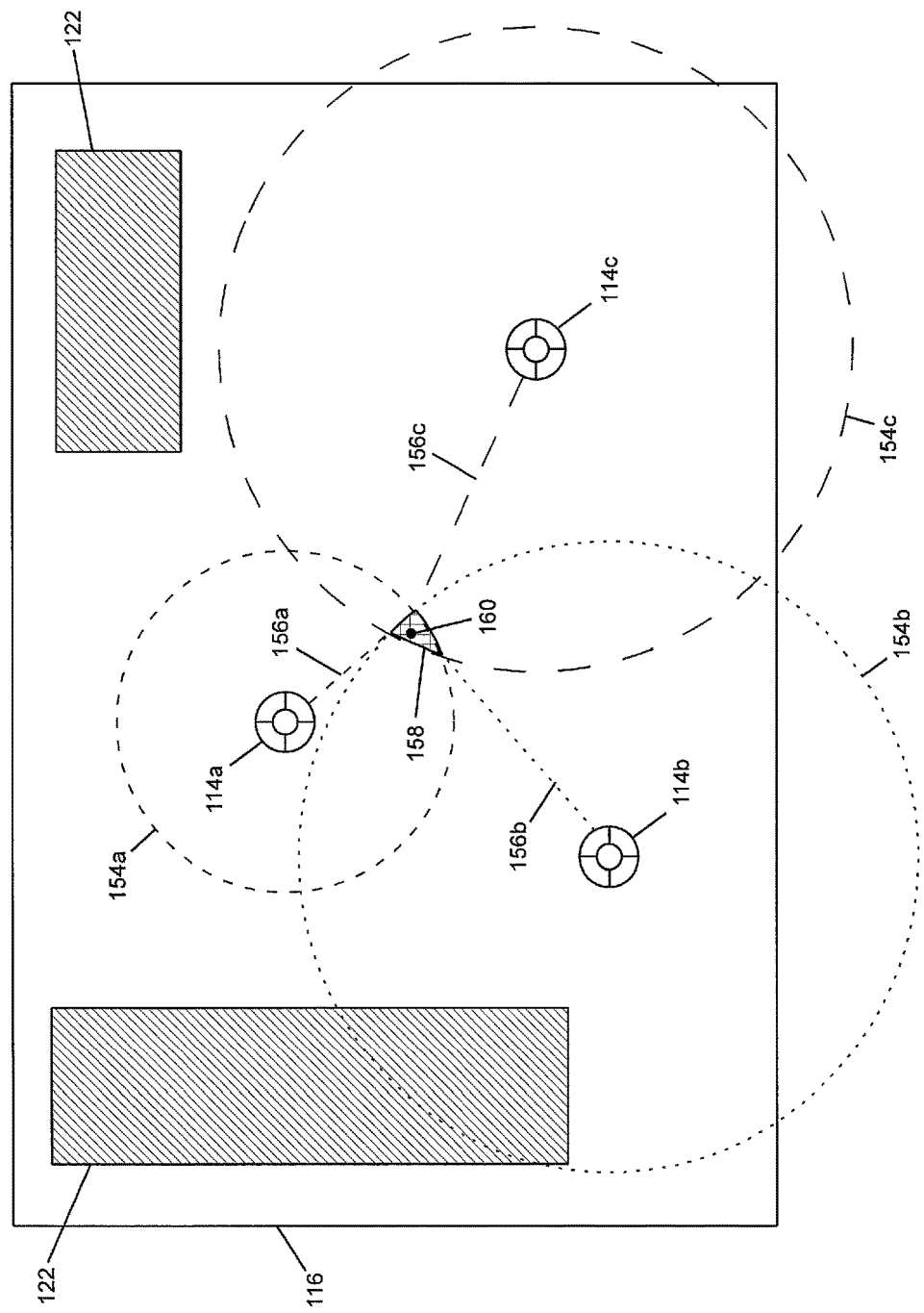
FIG. 4 is an example of a wireless environment having three wireless arrays illustrating an approach to determining the location of a station in a wireless environment having three or more wireless arrays.

Referring to FIG. 4, a wireless environment 116 having three wireless access points 114a, 114b, and 114c is shown. In this example, the three wireless access points 114a, 114b, and 114c are wireless arrays. When the wireless environment 116 includes three or more wireless arrays 114, the localization module 132 (FIG. 1) may employ lateration approach to determine the location of the station 118 in the wireless environment. When the wireless environment 116 includes three wireless arrays 114 as shown by way of example in FIG. 4, the lateration approach may be referred to as trilateration; when the wireless environment includes more than three wireless arrays, the lateration approach may be referred to as multilateration.

As discussed above in reference to FIG. 2, the location of the wireless arrays 114 in the wireless environment 116 may be indicated on a scaled floor map of the wireless environment. Therefore, the respective distances 131 between the wireless arrays may be known to the network management system 124. The station 118 between the wireless arrays 114 may transmit wireless signals as probe requests to the wireless arrays, and the wireless arrays may store respective RSS values for the probe requests. Additionally, the wireless arrays 114 may exchange wireless signals with each other as each wireless array monitors the other wireless arrays in the wireless environment 116 via a monitor transceiver (e.g., transceiver T1). The wireless arrays 114 may also store RSS values for the wireless signals received from the other wireless arrays. The network management system 124 may query the wireless arrays 114 for the RSS values corresponding to wireless signals from the station and from the other wireless arrays and receive the RSS information from the wireless arrays in response.

Once the network management system 124 has obtained the RSS information, the shadow fading determination module 128 may first determine an average shadow fading factor, $S_{avg}$, for the wireless environment 116 according to the approach set forth above, i.e., based on the known distances 131 between the wireless arrays 114 and the RSS values of the wireless signals exchanged between the wireless arrays. The distance determination module 130 of the network management system 124 may then determine the respective distances 133 between the station 118 and the wireless arrays 114 according to the approach set forth above, i.e., based on the RSS values of the wireless signals received from the station and the average shadow fading factor, $S_{avg}$, for the wireless environment 116.

In this example approach, the direction of the station 118 relative to the wireless arrays 114 may be unknown. For example, if the distance determination module 130 determines that the station 118 is 20 feet away from a wireless array 114, the station may be 20 feet away in any direction, i.e., 20 feet north of the wireless array, 20 feet south, 20 feet east, 20 feet west, etc. As a result, the distance determination module 130 identifies a circular region having a radius equal to the distance between the station 118 and the wireless array 114. The circular region thus represents all possible directions the station 118 may be located at relative to the wireless array 114. As seen in FIG. 4, circular regions 154a, 154b, and 154c have been respectively determined for each of the wireless arrays 114a, 114b, and 114c. As shown by way of example in FIG. 4, each wireless array 114 is at the center of its respective circular region 154. Additionally, the radii 156 the circular regions 154 correspond to the respective distances 133 between the station 118 and the wireless arrays 114 in FIG. 2. As seen in FIG. 4, the radius 156a of circular region 154a corresponds to the distance 133a between the station 118 and wireless array 114a; the radius 156b of circular region 154b corresponds to the distance 133b between the station 118 and wireless array 114b; and the radius 156c of circular region 154c corresponds to the distance 133c between the station 118 and wireless array 114c.

As seen in FIG. 4, the three circular regions 154, in this example, intersect resulting in region 158 where the three circular regions overlap. The localization module 132, in this example, identifies the overlapping region 158 as a sub-region in the wireless environment that the station 118 is located in. To approximate the location of the station 118 in the overlapping region 158, the localization module determines the center 160 of the overlapping region 158. The localization module 132 may determine the center 160 of the overlapping region 158 using trilateration techniques. The localization module 132 may thus determine that the center 160 of the overlapping region 158 corresponds to the approximate location of the station 118 in the wireless environment.

This approach may be extended where more than three wireless arrays 114 are installed in the wireless environment, in which case the localization module 132 may employ multilateration techniques to localize the station 118. Where the wireless environment includes more than three wireless arrays 114, the localization module 130 may narrow down the location of the station 118 to a relatively smaller overlapping region 158, and, as a result, the approximate location of the station may be more accurate.

Figure 5:
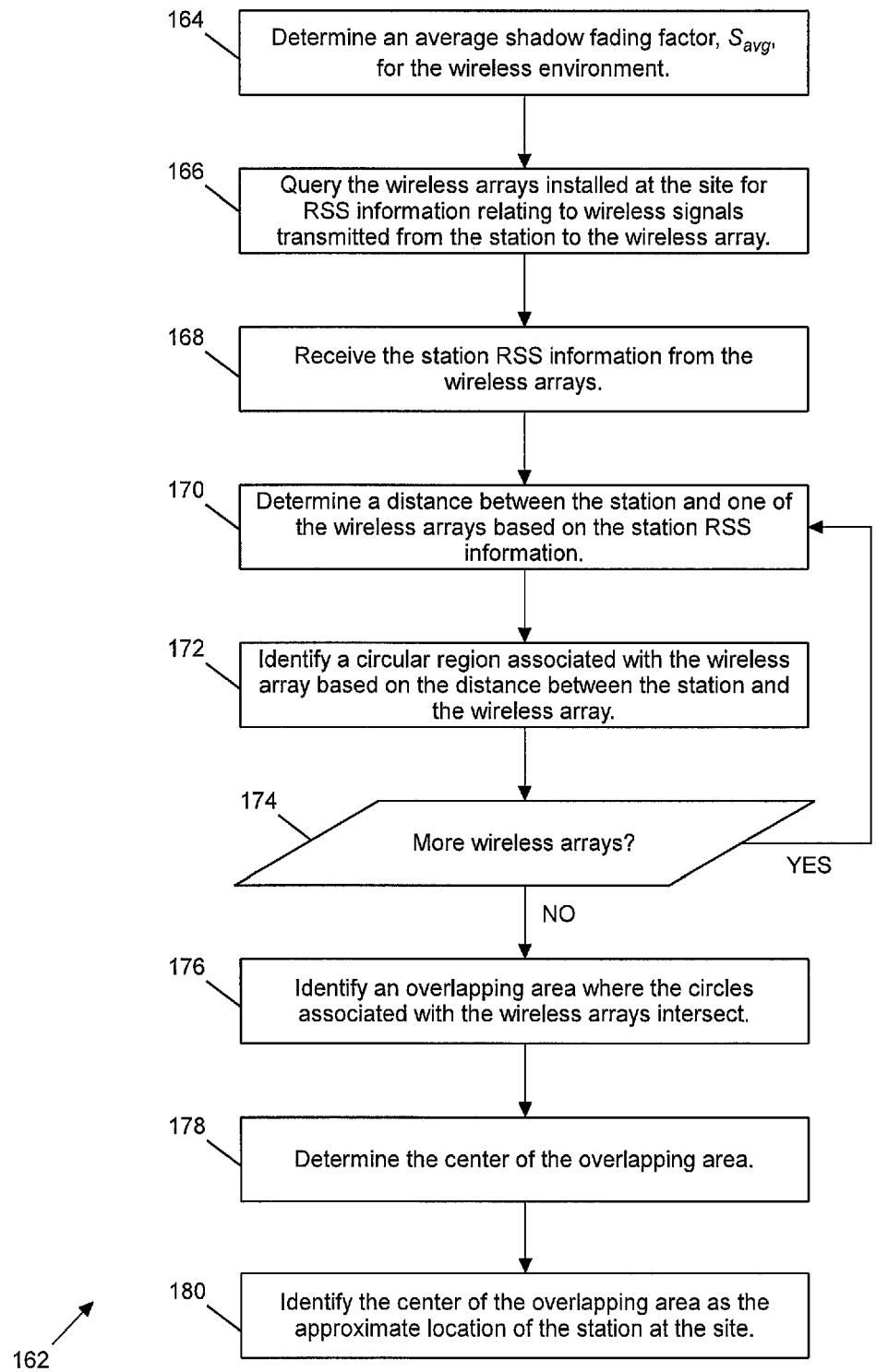
FIG. 5 is a flowchart of example method steps for determining the location of a station in a wireless environment where the wireless environment includes three or more wireless arrays.

Referring to FIG. 5, a flowchart 162 of example method steps for determining the location of a station 118 in a wireless environment 116 having three or more wireless access points 114 (e.g., wireless arrays) is shown. A network management system 124 (FIG. 2) may also carry out the example method steps shown in FIG. 5. The network management system 124 may be a network management system as described above in reference to FIG. 2. A shadow fading determination module 128 may determine an average signal fading factor, $S_{avg}$, for the wireless environment 116 (step 164) according to the approach set forth above. Also discussed above, a station 118 in the wireless environment 116 may transmit wireless signals to the wireless arrays 114, and the wireless arrays may determine and store RSS information relating to the wireless signals received from the station. The network management system 124 may query the wireless arrays 114 for the RSS information relating to the wireless signals received at the wireless arrays from the station (step 166), and the RSS information may be received at the network management system from the wireless arrays in response (step 168).

The distance determination module 130 may determine the distance between the station 118 and a wireless array 114 based on the RSS information received from the wireless array (step 170). As mentioned above, the distance determination module 130 may use the average shadow fading factor, $S_{avg}$, when determining the distance 133 between the station 118 and the wireless array 114 to improve the accuracy of the distance determination. In turn, the localization module 132 may identify a circular region 154 associated with the wireless array 114 based on the distance between the station and the wireless array (step 172). In this example, the radius 156 for the circular region 154 associated with the wireless array 114 may be equal to the distance 133 between the station 118 and the wireless array. Additionally, the circular region 154 may be configured such that the wireless array 114 associated with the circular region 154 is at the center of the circular region. If there are additional wireless arrays 114 in the wireless environment (step 174), then steps 170-172 may be repeated to determine respective circular regions 154 for the additional wireless arrays. In this example approach, three or more wireless arrays are used to determine the location of the station 118 in the wireless environment 116.

Once the localization module 132 determines the circular regions 154 for the wireless arrays 114, the localization module identifies an overlapping region 158 where the circular regions intersect (step 176), and determines the center 160 of the overlapping region (step 178). As discussed above the localization module 132 may employ trilateration or multilateration techniques to determine the center 160 of the overlapping region 158. In this example, the localization module 132 identifies the center 160 of the overlapping region 158 as corresponding to the approximate location of the station 118 in the wireless environment 116 (step 180).

Station Localization Using Two Wireless Arrays

Figure 6A:
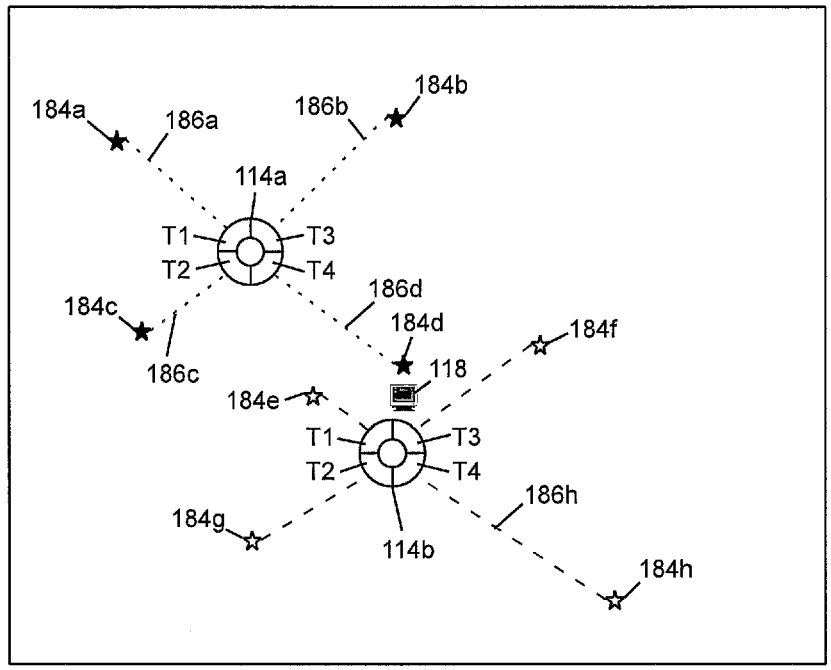
FIG. 6A is an example of a wireless environment having two wireless arrays illustrating another approach to determining the location of a station a wireless environment having two wireless arrays.
Figure 6B:
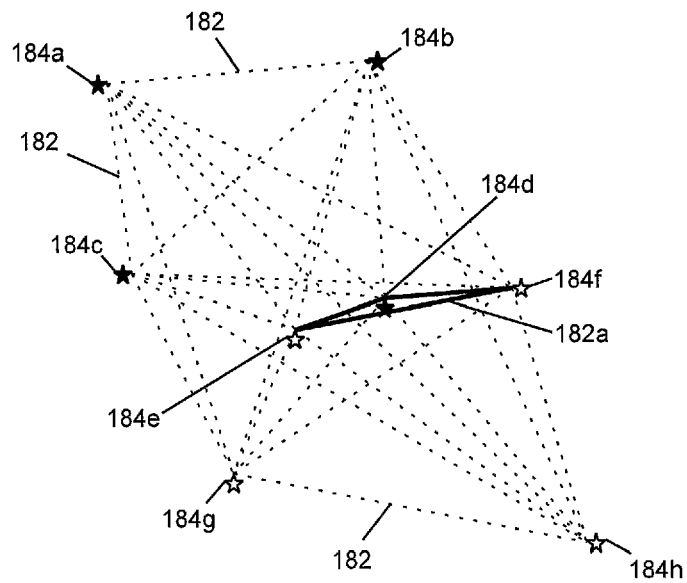
FIG. 6B is an example set of data points and the potential triangles that may be formed from the subsets of three data points for the set of data points.

Referring now to FIG. 6A and FIG. 6B, a wireless environment 116 having two wireless access points 114a and 114b and a station 118 is shown. In this example, the wireless environment 116 may be an outdoor wireless environment, and the wireless access points 114a and 114b are wireless arrays having multiple transceivers T1-T4. When a wireless environment 116 includes two wireless arrays 114, the localization module 132 (FIG. 2) of the network management system 124 may employ an alternative approach to determine the location of the station 118 in the wireless environment. In this example alternative approach, the localization module 132 uses the orientation information provided by the magnetometer 106 (FIG. 1) of each wireless array 114 when localizing the station 118 in the wireless environment 116. Instead of using circular regions and lateration as described above, the localization module 132 in this example approach identifies multiple triangular sub-regions 182 (FIG. 6B) in the wireless environment 116 and determines that the station is located in one of the triangular sub-regions of the wireless environment 116. The triangular sub-regions 182 are based on a set of coordinates 184a-h in the wireless environment 116. Each vertex of a triangular sub-region 182 corresponds to one of the coordinates. The localization module 132, in this example, selects the coordinates 184 based on the respective orientations of the transceivers T1-T4 of the wireless arrays 114a and 114b and based on the respective distances 186a-h between the station 118 and the transceivers of the wireless arrays.

As discussed above, the station 118 transmits wireless signals as probe requests to the transceivers T1-T4 of the wireless arrays 114, and the wireless arrays determine an RSS value for the wireless signals received at the transceivers. The transceivers T1-T4 of the wireless arrays 114 may include directional antennas 102 (FIG. 1) that broadcast a directional antenna pattern 110 as also discussed above. Furthermore, the magnetometer 106 indicates the orientation of the wireless array 114, and the orientation information may be used to determine respective spatial orientations of the wireless array transceivers T1-T4 (e.g., 0°, 45°, 90°, etc.). The network management system 124 being in signal communication with the wireless arrays 114 and may retrieve the orientation information and the RSS values stored at the wireless arrays.

The shadow fading determination module 128 may determine an average shadow fading factor, $S_{avg}$, for the wireless environment 116 according to the approach set forth above. The distance determination module 130 may use the average shadow fading factor, $S_{avg}$, when determining the distance, D, between the station 118 and a wireless array transceiver T also according to the approach set forth above. The localization module 132 then selects a coordinate 184 to associate with a wireless array transceiver T based on the distance, D, and based on the spatial orientation of the wireless array transceiver (e.g., 0°, 45°, 90°, etc.).

As seen in FIG. 6A, the station 118, in this example, is positioned between the two wireless arrays 114a and 114b in the wireless environment 116. The two wireless arrays 114a and 114b in the example shown each include four transceivers T1-T4. The four transceivers T1-T4 of each wireless array 114a and 114b are respectively oriented at 45°, 135°, 225°, and 315° respectively (i.e., north-east, south-east, south-west, and north-west). The magnetometer 106 at each wireless array 114 may provide information regarding the orientation of each wireless array, which may be used to determine the orientation of the transceivers T1-T4. The network management system 124, in this example, may query the wireless arrays 114 for the orientation information and determine the respective orientations for the transceivers T1-T4 at each wireless array. The distance determination module 130 of the network management system 124 may determine the respective distances between the station 118 and the transceivers T1-T4 based on the RSS of wireless signals transmitted from the station to the wireless array transceivers.

Once the network management system 124 has determined respective distances 186a-h between the station 118 and the transceivers T1-T4 as well as the orientation of the transceivers, the localization module 132 may identify a respective coordinate for the transceivers T1-T4. The location of the coordinates, in this example, respectively correspond to the orientation of the transceivers T1-T4 and respectively correspond to the distance between the station 118 and the transceivers.

As shown in FIG. 6A, the localization module 132 has selected a respective coordinate for each transceiver T1-T4 at each wireless array 114a and 114b. Accordingly, the localization module 132 has selected eight total coordinates 184a-h (four coordinates for the four transceivers of each wireless array). As seen in FIG. 6A, the position for the coordinates 184 respectively correspond to the orientations of the transceivers T1-T4 the coordinates are respectively associated with. Regarding wireless array 114a, for example, transceiver T1 and its associated coordinate 184a are both oriented north-west (315°) relative to the wireless array. Additionally, the position of coordinate 184a relative to transceiver T1 of wireless array 114a corresponds the determined distance 186a between the station 118 and transceivers T1. The distances 186a-h between the station 118 and the transceivers T1-T4 for the wireless arrays 114a and 114b may be determined based on the RSS of wireless signals transmitted to the transceivers from the station.

Once the localization module 132 determines the set of coordinates 184, the localization module iteratively selects three of the coordinates from the set of coordinates to form a triangular sub-region 182. In this example, the localization module 132 iteratively selects a three coordinates 184 from the set of coordinates to form every possible triangular sub-region 182 that could be formed from the set of coordinates. For each triangular sub-region 182 formed, the localization module 132 determines the area of the triangular sub-region. The localization module 132 then compares the areas of the triangular sub-regions to determine which triangular sub-region has the smallest area.

In this example, the localization module 132 determines that the station 118 is located in the triangular sub-region 182 having the smallest area. To approximate the location of the station 118 in the triangular sub-region 182 having the smallest area, the localization module 132 determines the circumcenter of the triangular sub-region. In this example, the circumcenter is the center of a circle that that passes through each vertex of the triangular sub-region (or alternatively, the circumcenter is the intersection point of the perpendicular bisectors of the triangular sub-region). The localization module identifies the circumcenter of the triangular sub-region having the smallest area as the approximate location of the station in the wireless environment.

Referring to FIG. 6B, the potential triangular sub-regions 182 that may be formed using the set of coordinates 184 of FIG. 6A is shown. As seen in FIG. 6B, the triangular sub-region 182 having the smallest area is the triangular sub-region 182a with vertices corresponding to coordinates 184d, 184e, and 184f. The localization module 132 may determine the circumcenter for this triangular sub-region 182a and identify the circumcenter as corresponding to the approximate location of the station in the wireless environment 116.

Figure 7:
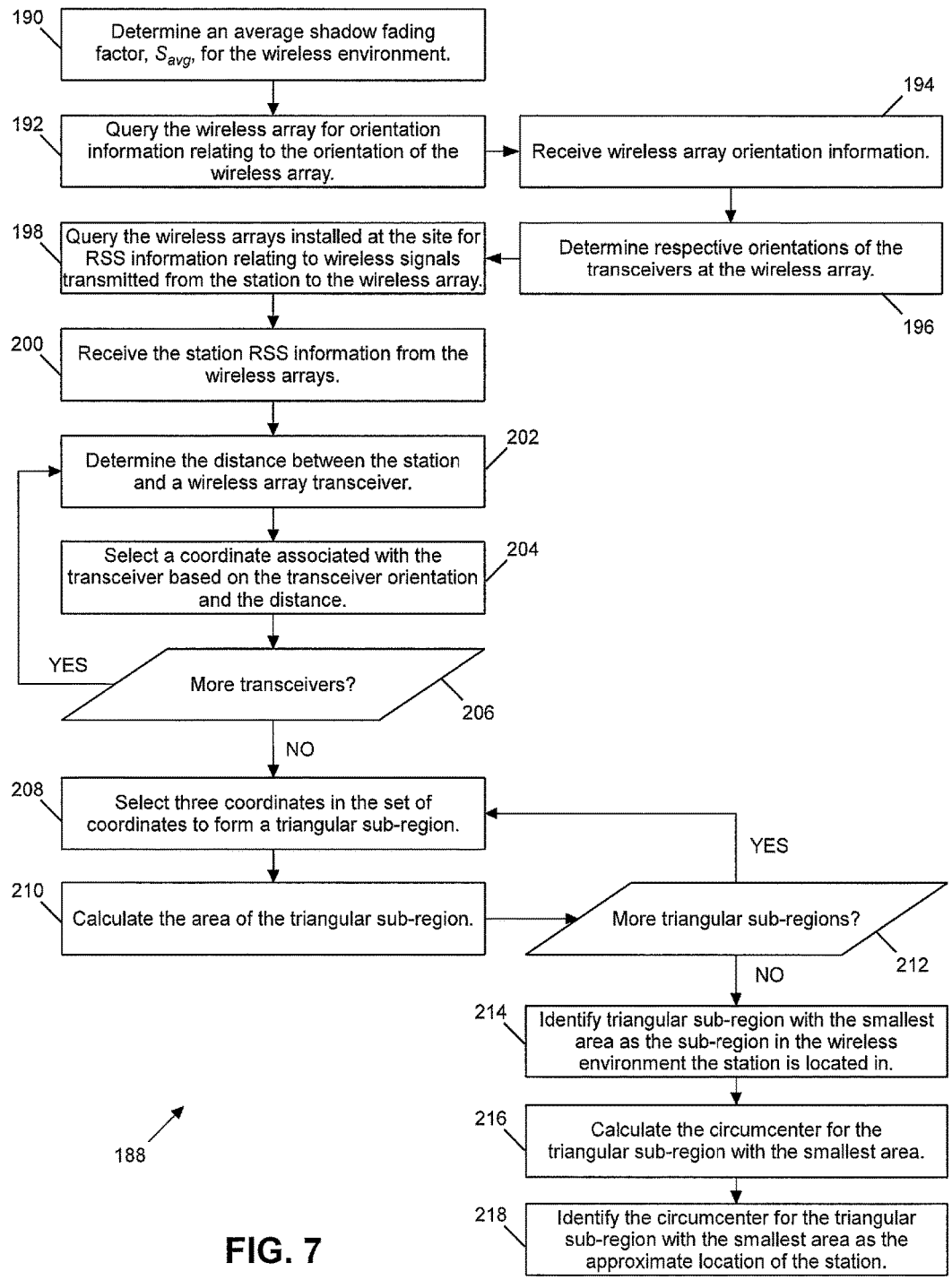
FIG. 7 is a flowchart of example method steps for determining the location of a station in a wireless environment where the wireless environment includes two wireless arrays.

Referring now to FIG. 7, a flowchart 188 of example method steps for determining the location of a station 118 having two wireless arrays 114 is shown. Like before, a network management system 124 (FIG. 2) may carry out the example method steps shown in FIG. 7. The network management system 124 may be a network management system as described above in reference to FIG. 2. Also, as previously shown, a shadow fading determination module 128 may determine an average shadow fading factor, $S_{avg}$, for the wireless environment 116 (step 190). As discussed above, the wireless arrays 114, in this example, include a magnetometer 106 that provides orientation information relating to the orientation of the wireless array, i.e., the direction the wireless array is facing. Accordingly, the network management system 124 may query the wireless arrays 114 for the respective orientation information provided by the magnetometers 106 (step 192), and the orientation information may be received from the wireless arrays in response (step 194). Based on the orientation information, the network management system 124 may determine the orientation of the transceivers of the wireless arrays 114 (step 196).

Also discussed above, the station 118 may transmit wireless signals to the wireless arrays 114 in the wireless environment 116, and the wireless arrays may store RSS information relating to the wireless signals received from the station. The network management system 124 may query the wireless arrays 114 for the station RSS information (step 198), and the RSS information may be received from the wireless arrays in response (step 200). Based on the RSS information, the distance determination module 130 may determine the distance between the station and a transceiver of a wireless array 114 (step 202). The localization module 132 may then select a coordinate 184 in the wireless environment 116 associated with the transceiver (step 204). The coordinate 184, in this example, is selected such that the location of the coordinate 184 corresponds to the distance between the station and the transceiver as well as the spatial orientation of the transceiver. In this example, the localization module 132 selects the coordinate 184 such that the orientation of the coordinate in the wireless environment 116 relative to the wireless array is the same as the spatial orientation for the transceiver the coordinate is associated with. If there are additional transceivers (step 206), then the steps 202-204 may be repeated, in this example, to select additional coordinates 184 for the additional transceivers in signal communication with the station 118.

Once the localization module 132 has compiled a set of coordinates 184 respectively corresponding to the transceivers in signal communication with the station 118, the localization module may select three coordinates from the set of coordinates to identify a triangular sub-region 182 of the wireless environment 116 (step 208), and calculates the area of the triangular sub-region (210). In this example, the localization module identifies every possible triangular sub-region 182 that may be formed by selecting three coordinates 184 from the set of coordinates. Accordingly, the localization module 132 may repeat steps 208-210 if there are additional triangular sub-regions 182 (step 212) that may be formed by selecting three coordinates 184 from the set of coordinates.

The localization module 132, in this example, determines which triangular sub-region 182 has the smallest area and identifies the triangular sub-region having the smallest area as the sub-region in the wireless environment 116 that the station is located in (step 214). The localization module 132 then determines the circumcenter of the triangular sub-region 182 having the smallest area (step 216) and identifies the circumcenter as corresponding to the approximate location of the station 118 in the wireless environment 116 (step 218). This approach may be employed where there are two wireless arrays installed in the wireless environment 116.

It will be understood and appreciated that one or more of the processes, sub-processes, and process steps described in connection with FIGS. 1-7 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in FIG. 1. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module, which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., a wireless array in FIG. 1 and a network management system in FIG. 2), direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A computer-implemented method of quantifying the shadow fading observed in a wireless environment having a plurality of wireless access points comprising:
    receiving location information relating to respective locations of the plurality of wireless access points in the wireless environment;
    selecting a plurality of transceiver pairings from the plurality of wireless access points;
    determining, based on the location information, a distance between individual wireless access points associated with the transceiver pairings to obtain a plurality of distances;
    causing at least one wireless signal to be transmitted between each of the plurality of transceiver pairings;
    determining a plurality of shadow fading factors based on the plurality of distances and received signal strength (RSS) information respectively associated with the at least one wireless signal transmitted between each of the plurality of transceiver pairings; and
    determining an average shadow fading factor based on the plurality of shadow fading factors.

2. The computer-implemented method of claim 1 wherein:
    the plurality of shadow fading factors are determined using a path loss model and an RSS model.

3. The computer-implemented method of claim 2 wherein:
    the path loss model is expressed as $PL=PLret+10 \log(Dn)+S$; and
    the RSS model is expressed as $RXpwr=TXpwr-LTX+GTX-PL-LRX+GRX$.

4. The computer-implemented method of claim 2 further comprising:
    displaying a map of the wireless environment; and
    receiving the location information as user input wherein the user input relates to positions on the map and wherein the positions on the map correspond to the respective locations of the plurality of wireless access points at the wireless environment.

5. A system for quantifying the shadow fading observed in a wireless environment having a plurality of wireless access points comprising:
    a distance determination module in signal communication with the plurality of wireless access points, the distance determination module
        selects a plurality of transceiver pairings from the plurality of wireless access points, and
        determines, based on location information that relates to respective locations of the plurality of wireless access points in the wireless environment, a distance between individual wireless access points associated with the transceiver pairings to obtain a plurality of distances; and
    a shadow fading determination module in signal communication with the plurality of wireless access points, the shadow fading determination module
        causes at least one wireless signal to be transmitted between each of the plurality of transceiver pairings, determines a plurality of shadow fading factors based on the plurality of distances and based on received signal strength (RSS) information respectively associated with the at least one wireless signal transmitted between each of plurality of transceiver pairings, and determines an average shadow fading factor based on the plurality of shadow fading factors.

6. The system of claim 5 wherein:

the shadow fading determination module determines the plurality of shadow fading factors using a path loss model and an RSS model.

7. The system of claim 6 wherein:

the path loss model is expressed as PL=PLret+10 log (Dn)+S; and the RSS model is expressed as RXpwr=TXpwr−LTX+ GTX−PL−LRX+GRX.

8. The system of claim 6 further comprising an interface module that displays a map of the wireless environment and receives the location information as user input wherein the user input relates to positions on the map and wherein the positions on the map correspond to the respective locations of the plurality of wireless access points at the wireless environment.

9. A computer-implemented method of localizing a station in a wireless environment having a plurality of wireless access points comprising:

receiving location information relating to respective locations of the plurality of wireless access points in the wireless environment;

selecting a plurality of transceiver pairings from the plurality of wireless access points;

determining, based on the location information, a distance between individual wireless access points associated with the transceiver pairings to obtain a first plurality of distances;

causing at least one wireless signal to be transmitted between each of the plurality of transceiver pairings;

determining a plurality of shadow fading factors based on the first plurality of distances and received signal strength (RSS) information respectively associated with the at least one wireless signal transmitted between each of the plurality of transceiver pairings; and determining an average shadow fading factor based on the plurality of shadow fading factors;

determining a second plurality of distances between the station and individual wireless access points in the plurality of wireless access points based on the average shadow fading factor for the wireless environment and based on RSS information received from the individual wireless access points;

identifying a sub-region in the wireless environment that the station is located in based on the second plurality of distances; and identifying a location associated with the sub-region that corresponds to an approximate location of the station in the wireless environment.

10. The computer-implemented method of claim 9 wherein:

individual distances in the second plurality of distances are determined using a path loss model and an RSS model.

11. The computer-implemented method of claim 10 wherein:

the path loss model is expressed as PL=PLret+10 log (Dn)+S; and the RSS model is expressed as RXpwr=TXpwr−LTX+ GTX−PL−LRX+GRX.

12. The computer-implemented method of claim 10 wherein:

the group of wireless access points includes at least three wireless access points;

identifying a sub-region in the wireless environment that the station is located in includes identifying respective circular regions for the individual wireless access points wherein respective radii of the circular regions respectively correspond to the individual distances in the second plurality of distances and wherein centers of the circular regions respectively correspond to locations of the individual wireless access points at the wireless environment, and identifying an overlapping region corresponding to an intersection of the circular regions; and identifying a location associated with the sub-region that corresponds to an approximate location of the station in the wireless environment includes determining a center of the overlapping region, and identifying the center of the overlapping region as the location that corresponds to the approximate location of the station at the wireless environment.

13. The computer-implemented method of claim 10 wherein:

the group of wireless access points includes two wireless access points, the wireless access points each having a plurality of transceivers and a magnetometer that determines a spatial orientation of the wireless access point;

the second plurality of distances between the station and the individual wireless access points includes distances between the station and individual transceivers in the plurality of transceivers; and identifying a sub-region in the wireless environment that the station is located in includes identifying a plurality of triangular sub-regions of the wireless environment based on respective spatial orientations of the individual transceivers and the respective distances between the station and the individual transceivers, and determining that one of the triangular sub-regions in the plurality of triangular sub-regions is the sub-region in the wireless environment that the station is located in.

14. The computer-implemented method of claim 13 wherein:

individual triangular sub-regions in the plurality of triangular sub-regions have vertices corresponding to a set of three coordinates in the wireless environment; and individual coordinates in the set of coordinates correspond to a spatial orientation of one of the transceivers and a distance between the station and the transceiver.

15. The computer-implemented method of claim 13 wherein:

determining that one of the triangular sub-regions in the plurality of triangular subregions is the sub-region in the wireless environment that the station is located in includes determining respective areas for individual triangular sub-regions in the plurality of triangular sub-regions, identifying a triangular sub-region in the plurality of triangular sub-regions having the smallest area, and determining that the triangular sub-region having the smallest area is the triangular sub-region the station is located in.

16. The computer-implemented method of claim 15 wherein identifying a location associated with the sub-region that corresponds to an approximate location of the station in the wireless environment includes:
  determining a center of the triangular sub-region the station is located in; and
  identifying the center of the triangular sub-region the station is located in as the location that corresponds to the approximate location of the station in the wireless environment.

17. The computer-implemented method of claim 16 wherein the center of the triangular sub-region the station is located in is the circumcenter.

18. The computer-implemented method of claim 13 further comprising determining the respective spatial orientations of the individual transceivers in the individual wireless arrays based on orientation information received from the individual wireless arrays.

19. A system for localizing a station in a wireless environment having a plurality of wireless access points comprising:
  a first distance determination module in signal communication with the plurality of wireless access points, the distance determination module
    selects a plurality of transceiver pairings from the plurality of wireless access points, and
    determines, based on location information that relates to respective locations of the plurality of wireless access points in the wireless environment, a distance between individual wireless access points associated with the transceiver pairings to obtain a first plurality of distances; and
  a shadow fading determination module in signal communication with the plurality of wireless access points, the shadow fading determination module
    causes at least one wireless signal to be transmitted between each of the plurality of transceiver pairings,
    determines a plurality of shadow fading factors based on the first plurality of distances and based on received signal strength (RSS) information respectively associated with the at least one wireless signal transmitted between each of plurality of transceiver pairings, and
  determines an average shadow fading factor based on the plurality of shadow fading factors;
  a second distance determination module that determines a second plurality of distances between the station and individual wireless access points in the plurality of wireless access points based on the shadow fading factor for the wireless environment and based on RSS information received from individual wireless access points in the plurality of access points; and
  a localization module that identifies a sub-region in the wireless environment that the station is located in based on the second plurality of distances and identifies a location associated with the sub-region that corresponds to an approximate location of the station in the wireless environment.

20. The system of claim 19 wherein:
individual distances in the second plurality of distances are determined using a path loss model and an RSS model.

21. The system of claim 20 wherein:
the path loss model is expressed as PL=PLret+10 log (Dn)+S; and
the RSS model is expressed as RXpwr=TXpwr−LTX+GTX−PL−LRX+GRX.

22. The system of claim 21 wherein:
the group of wireless access points includes two wireless access points, the wireless access points each having a plurality of transceivers and a magnetometer that determines a spatial orientation the wireless access points;
the second distance determination module determines the second plurality of distances between the station and individual transceivers in the plurality of transceivers based on the RSS information and the shadow fading factor;
the localization module identifies a plurality of triangular sub-regions of the wireless environment based on respective spatial orientations of the individual transceivers and the respective distances between the station and the individual transceivers; and
the localization module determines that one of the triangular sub-regions in the plurality of triangular sub-regions is the sub-region in the wireless environment that the station is located in.

23. The system of claim 22 wherein:
individual triangular sub-regions in the plurality of triangular sub-regions have vertices corresponding to a set of three coordinates in the wireless environment; and
individual coordinates in the set of coordinates correspond to a spatial orientation of one of the transceivers and a distance between the station and the transceiver.

24. The system of claim 22 wherein the localization module:
determines respective areas for individual triangular sub-regions III the plurality of triangular sub-regions;
identifies a triangular sub-region in the plurality of triangular sub-regions having the smallest area; and
determines that the triangular sub-region having the smallest area is the triangular sub-region the station is located in.

25. The system of claim 24 wherein the localization module:
determines a center of the triangular sub-region the station is located in; and
identifies the center of the triangular sub-region the station is located in as the location that corresponds to the approximate location of the station in the wireless environment.

26. The system of claim 25 wherein the center of the triangular sub-region the station is located in is the circumcenter.

27. The system of claim 22 wherein the localization module determines the respective spatial orientations of individual transceivers in the plurality of transceivers of the individual wireless arrays based on orientation information received from the individual wireless arrays.

28. The system of claim 20 wherein:
the group of wireless access points includes at least three wireless access points;
the localization module identifies respective circular regions for the individual wireless access points wherein respective radii of the circular regions respectively correspond to the distances between the station and the individual wireless access points and wherein respective centers of the circular regions respectively correspond to locations of the individual wireless access points at the wireless environment;
the localization module identifies an overlapping region corresponding to an intersection of the circular regions;
the localization module determines a center of the overlapping region, and the localization module identifies the center of the overlapping region as the location that corresponds to the approximate location of the station in the wireless environment.

* * * * *